(12) United States Patent
Sakaguchi

(10) Patent No.: US 6,557,886 B1
(45) Date of Patent: May 6, 2003

(54) AIRBAG MODULE WITH COVER CAP

(75) Inventor: Takashi Sakaguchi, Mombris (DE)

(73) Assignee: Takata-Petri AG, Aschaffenburg (DE)

(*) Notice: Subject to any disclaimer, the term of this patent is extended or adjusted under 35 U.S.C. 154(b) by 0 days.

(21) Appl. No.: 09/581,969

(22) PCT Filed: Dec. 21, 1998

(86) PCT No.: PCT/DE98/03796
§ 371 (c)(1),
(2), (4) Date: Jun. 19, 2000

(87) PCT Pub. No.: WO99/32333
PCT Pub. Date: Jul. 1, 1999

(30) Foreign Application Priority Data

Dec. 22, 1997 (DE) ........................ 297 23 034 U

(51) Int. Cl.⁷ .............................................. B60R 21/16
(52) U.S. Cl. ................ 280/728.2; 280/728.3; 280/732
(58) Field of Search ............... 280/728.2, 728.3, 280/730.2, 732; 269/265, 271

(56) References Cited

U.S. PATENT DOCUMENTS

| | | | |
|---|---|---|---|
| 4,969,638 A | * 11/1990 | Yang | 269/261 |
| 5,145,207 A | 9/1992 | Bederka et al. | 280/732 |
| 5,303,951 A | 4/1994 | Goestenkors et al. | 280/728 |
| 5,312,130 A | 5/1994 | Baba | 280/728 |
| 5,445,409 A | * 8/1995 | Abramczyk et al. | 280/728.2 |
| 5,482,313 A | 1/1996 | Ikeya et al. | 280/728.2 |
| 5,527,064 A | 6/1996 | Kai et al. | 280/728.2 |
| 5,564,732 A | * 10/1996 | Bauer et al. | 280/728.3 |
| 5,851,023 A | * 12/1998 | Nagata et al. | 280/728.3 |
| 5,876,058 A | * 3/1999 | Nemoto | 280/728.2 |
| 5,887,891 A | * 3/1999 | Taquchi et al. | 280/728.2 |
| 6,056,313 A | * 5/2000 | Lutz et al. | 280/728.1 |
| 6,152,480 A | * 11/2000 | Iwanaga | 280/728.3 |
| 6,161,865 A | * 12/2000 | Rose et al. | 280/728.3 |
| 6,296,270 B1 | * 10/2001 | Amamori | 280/728.2 |

FOREIGN PATENT DOCUMENTS

| | | |
|---|---|---|
| EP | 0 739 788 | 10/1996 |
| EP | 0 790 151 | 8/1997 |
| JP | 7 117609 | 5/1995 |

* cited by examiner

Primary Examiner—Lesley D. Morris
Assistant Examiner—L. Lum
(74) Attorney, Agent, or Firm—Foley & Lardner

(57) ABSTRACT

This invention relates to an airbag module, especially a passenger airbag module, having a module housing and a cover plate with at least one side wall, whereby said cover plate is a separate component that rests upon a surrounding component. The invention provides two means of engagement. A first engaging means allows the cover plate to move in relation to the surrounding component. A second engaging means allows the cover plate to move in relation to the module housing.

11 Claims, 5 Drawing Sheets

DIRECTION OF TRAVEL

LATERAL DIRECTION

AIRBAG MODULE WITH COVER CAP

BACKGROUND

The invention relates to an airbag module, and more particularly to a front-seat passenger air bag module with a cover cap.

U.S. Pat. No. 5,482,313 discloses a cover cap for a front-seat passenger airbag module. This cap is provided as a separate part in an orifice of the instrument panel below which the housing of the airbag module is located. Hooks are provided in the upper region of the housing. The hooks engage into orifices of elastic tongues of the cover cap. Furthermore, on the cover cap there are claws that engage under the instrument panel in the region of the orifice, so that the cover cap is detained. This type of fastening allows a lateral movement of the cover cap to a slight extent. In the event of a crash, the cover cap is torn open, without the instrument panel being damaged.

Japanese preliminary publication 7-117609 discloses a front-seat passenger airbag module which, on the housing, has latching means engaging into cutouts on side walls of a cover cap. Movement of the cover cap relative to the housing is thereby possible within defined limits.

These abovementioned types of fastening of a cover cap separate from the instrument panel make it easier to match up the bearing surface between the instrument panel and the cover cap of the front-seat passenger airbag module when the front-seat passenger airbag module is being mounted. On the other hand, there is the disadvantage that, even after the airbag module has been mounted, the cover cap can move slightly due to the gap existing between the cover cap and the instrument panel, which may cause rattling noises.

Furthermore, EP 0 739 788 discloses a cover for an airbag module in which two latching means are provided. The first latching means provided are elastic projections on side walls of the cover, said projections engage under the instrument panel. The cover rests with its edge, without lateral play, in a depression of the instrument panel and is retained there. The side walls of the cover have perforations, into which hooks of the airbag housing engage as second latching means. The perforations are substantially larger than the hooks, so that, after the airbag housing has been mounted, the cover cap is displaceable relative to the housing both in the vertical direction and in the lateral direction. However, because the cover cap has to fit exactly into the intended depression of the instrument panel, the cover cap must be manufactured with insignificant tolerances.

SUMMARY OF THE INVENTION

An object of the invention is to provide a cover cap and a housing of an airbag module that the cover cap is sufficiently moveable for mounting the airbag module, but does not have be manufactured with narrow tolerances.

In an airbag module, in particular a front-seat passenger airbag module, with a module housing and a cover cap having at least one side wall, the cover cap being a separate component which rests on a surrounding component, according to the invention two latching means are arranged. A first latching means allows a movement of the cover cap relative to the surrounding component and a second latching means allows a movement of the cover cap relative to the module housing.

In this arrangement, the cover cap can be latched together with the surrounding component, for example with the instrument panel, even before the housing of the airbag module is fastened to the motor vehicle. Nevertheless, lateral and vertical movements of the housing, which are necessary, for example, because of manufacturing tolerances, can be carried out. After the housing has been fastened, the cover cap can still be moved in the vertical direction, so that the cover cap could be latched even after the fastening of the housing.

In a first embodiment, the cover cap and the first latching means are provided such that the cover cap is moveable laterally and in the direction of travel before the housing of the airbag module is fastened to the motor vehicle, and the second latching means and the module housing are provided such that movement between a side wall of the cover cap and the airbag module housing is possible only vertically in relation to the cover cap.

In a second embodiment, the cover cap, for its vertical moveability relative to the surrounding component, has flexible tongues resting on the surrounding component and flexible first latching means, and the second latching means and the module housing are provided such that movement between the side wall of the cover cap and the module housing is possible in the lateral direction and in the direction of travel.

The number of degrees of freedom of each latching means is at most two. This means that, after latching, the first latching means either still allow a defined lateral movement of the cover cap, but no vertical movement of the cover cap, or allow a vertical movement, but no lateral movement. On the other hand, the second latching means may allow only a vertical movement or a lateral movement.

It is expedient to provide as a first latching means elastically deformable catch hooks that engage under the surrounding component of the motor vehicle. The second latching means provided may be bolts on the housing of the airbag module that engage into long holes in the side wall of the cover cap.

The catch hooks are preferably arranged peripherally on the cover cap. The size of the free space between the catch hooks and the cover cap is such that the cover cap is guided, free of play, on the surrounding component of the motor vehicle. In this case, because of the elasticity of the catch hooks, the freedom from play does not necessitate a high degree of accuracy in the manufacture of the cover cap.

It is expedient that, when the cover cap is arranged on the instrument panel of a motor vehicle, the catch hooks on the sides of the cover cap which run transversely to the direction of travel are more rigid than the catch hooks on the sides of the cover cap which run in the direction of travel. This counteracts a displacement of the cover cap in the direction of travel after the airbag module has been mounted, such displacement still being possible due to the arrangement according to the invention. In addition, displacement can be counteracted by the catch hooks having roughened contact faces and/or having bosses or ribs.

In the case of a cover cap differing from the rectangular shape, the orifice provided in the surrounding subassembly for the emergence of the airbag expediently has opposite edges which are parallel to one another and the distance between which is different in places and opposite which the catch hooks are located at the corresponding distance in places.

BRIEF DESCRIPTION OF THE DRAWINGS

The invention will be explained in exemplary embodiments with reference to the drawings, in which.

DESCRIPTION

Figure 1:
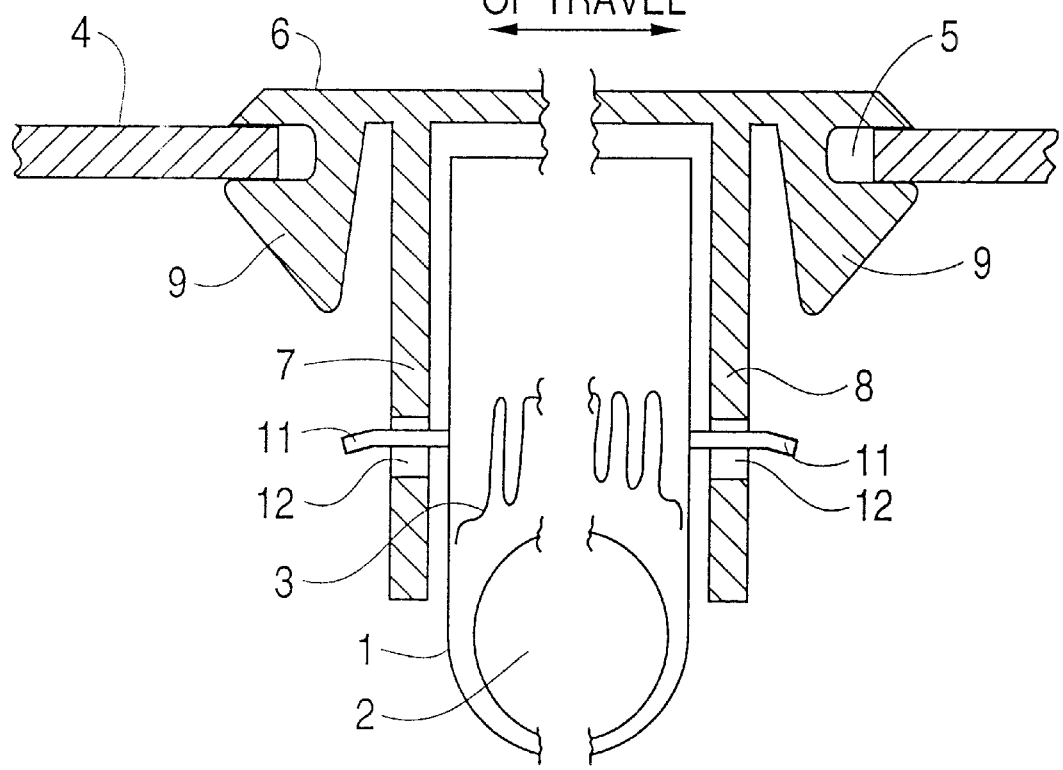
FIG. 1 is a cross section through a first embodiment of an airbag module with cover cap.
Figure 2:
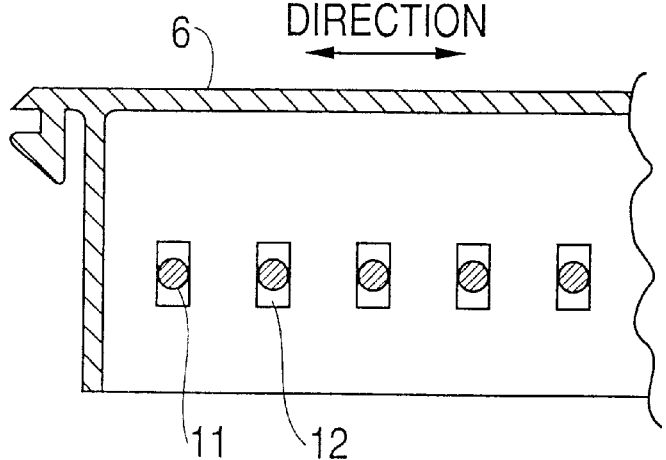
FIG. 2 is a longitudinal section through a portion of an airbag module according to an embodiment of the present invention.

As shown in FIG. 1, a housing 1 of an airbag module, with a gas generator 2 located therein, and with a gas bag 3, is arranged below an instrument panel 4. An orifice 5 (FIG. 7) provided in the instrument panel for the emergence of the gas bag is closed by means of a cover cap 6 having side walls, of which two opposite side walls 7, 8 can be seen in FIG. 1.

Figure 3:
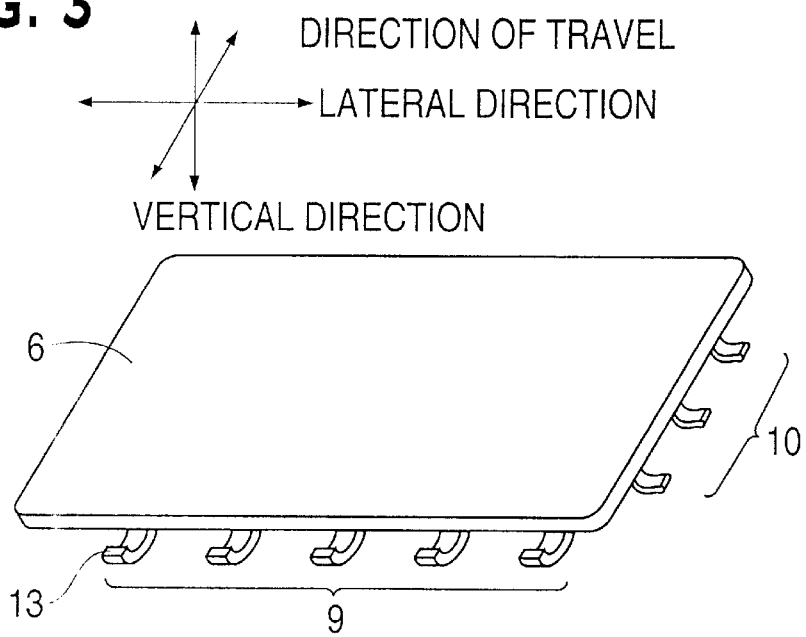
FIG. 3 is a perspective view of a cover cap according to an embodiment of the present invention, without its side walls being illustrated.

The cover cap 6 has catch hooks 9, 10. Only catch hooks 9 on the sides of the cover cap which run transversely to the direction of travel can be seen in FIG. 1. Catch hooks 9 and 10 in each case on one side of the cover cap can be seen in FIG. 3.

The contact face 13 of the catch hooks is sufficiently wide to allow the movement of the cover cap in the lateral direction and in the direction of travel of the motor vehicle. The distance of the catch hooks 9, 10 from the underside of the cover cap is such that the edge of the instrument panel 4 rests, free of play, between the two catch hooks. Consequently, the cover cap, after being latched to the instrument panel, can no longer move in the vertical direction.

The housing 1 of the airbag module has bolts 11 which engage into long holes 12 of the sidewalls 7, 8 of the cover cap 6. The long holes extend in the direction of the cover cap 6 and have a width such that the bolts can move without lateral play.

When the airbag module is mounted, it can be introduced, with the cover cap 6 already fastened, into the instrument panel from above. When the cover cap is pressed onto the instrument panel 4, the catch hooks 9, 10 are deformed elastically and then engage under the instrument panel 4. When the housing 1 is subsequently being fastened to the motor vehicle, said housing 1 can be raised slightly on account of the long holes 12 and be brought into the correct position by lateral displacement. By the cover cap 6 being designed according to the invention, the housing 1 can be displaced both in the lateral direction and in the direction of travel, moveability in the direction of travel being possible with less force than that applied in the lateral direction.

After the housing has been fastened, it is no longer possible for the cover cap to be displaced in the lateral direction because of the play-free mounting of the bolts 11 in the long holes. By contrast, on account of the possible movement of the bolts in the long holes in the direction of travel, the cover cap can move in this direction. After the housing has been mounted, however, such movement is undesirable. The catch hooks 9 which counteract movement in the direction of travel are therefore designed to be more rigid than the catch hooks 10 which act in the lateral direction. Furthermore, the contact faces 13 of the catch hooks 9 are roughened. The catching forces acting in the direction of travel and in the vertical direction are consequently greater than the catching forces acting in the lateral direction.

Figure 4:
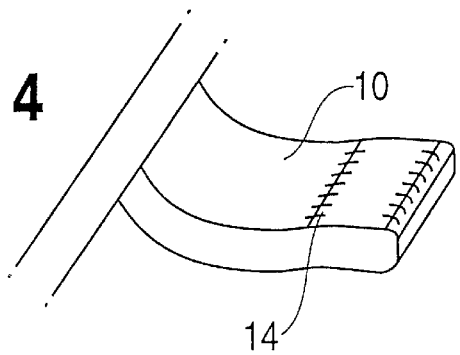
FIG. 4 is an illustration of a hook which is arranged on a side of the cover cap which runs in the direction of travel according to an embodiment of the present invention.
Figure 5:
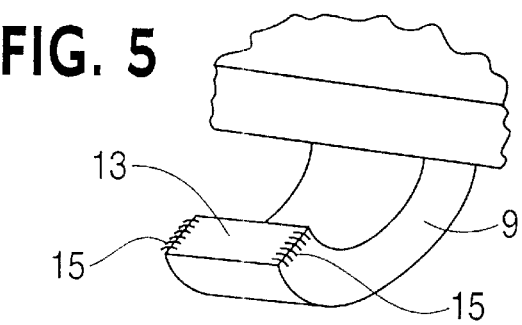
FIG. 5 is an illustration of a hook which is arranged on a side of the cover cap which runs transversely to the direction of travel according to an embodiment of the present invention.

It is apparent from FIGS. 4 and 5 that transverse edges 14 of the catch hooks 10 and longitudinal edges 15 of the catch hooks 9 are rounded, in order to allow an easier lateral movement of the cover cap.

Figure 6:
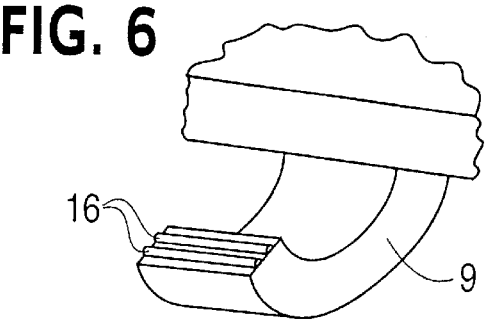
FIG. 6 is a hook with ribs arranged on the contact face according to an embodiment of the present invention.

A further embodiment of the catch hooks 9 can be seen from FIG. 6. There, ribs 16 running in the lateral direction are provided on the contact face of the catch hooks 9. This achieves, on the one hand, easier moveability of the cover cap in the lateral direction, but more difficult moveability in the direction of travel. In this version, rattling of the cover cap is avoided with greater reliability.

Figure 7:
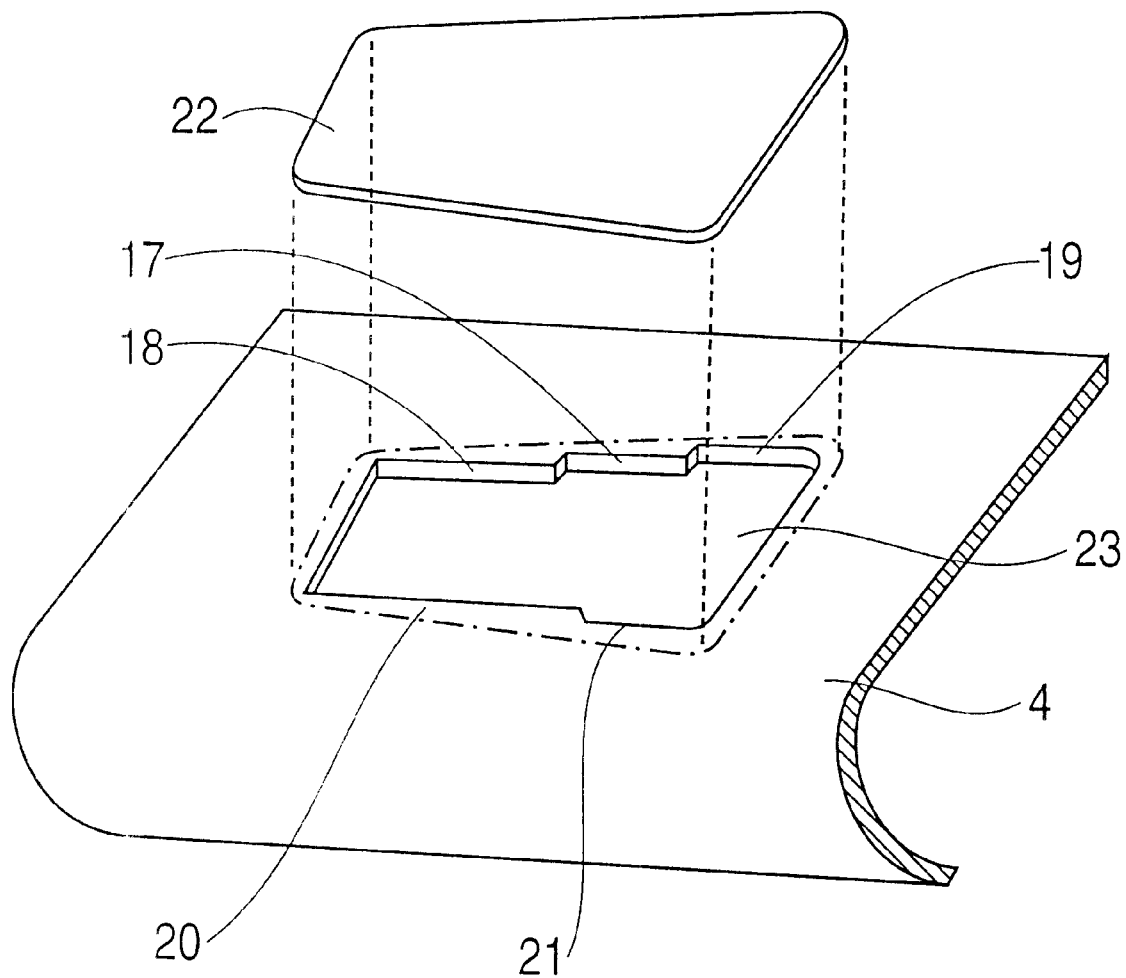
FIG. 7 is a detail of an instrument panel.

Insofar as the orifice 5 in the instrument panel is rectangular and the cover cap is likewise rectangular, the latching ratio remains unchanged before and after displacement. However, if a trapezoidal cover cap 22 is provided, as illustrated in FIG. 7, the latching ratio would change if the orifice were to have a corresponding trapezoidal shape. In order to avoid this, edges 17, 18, 19, 20, 21 of an orifice 23 are provided, which run locally parallel to the lateral direction which are approximate to the trapezoidal shape, that is to say are at a different distance from one another. The catch hooks, not illustrated, are also located opposite one another at a correspondingly different distance in places.

Figure 8:
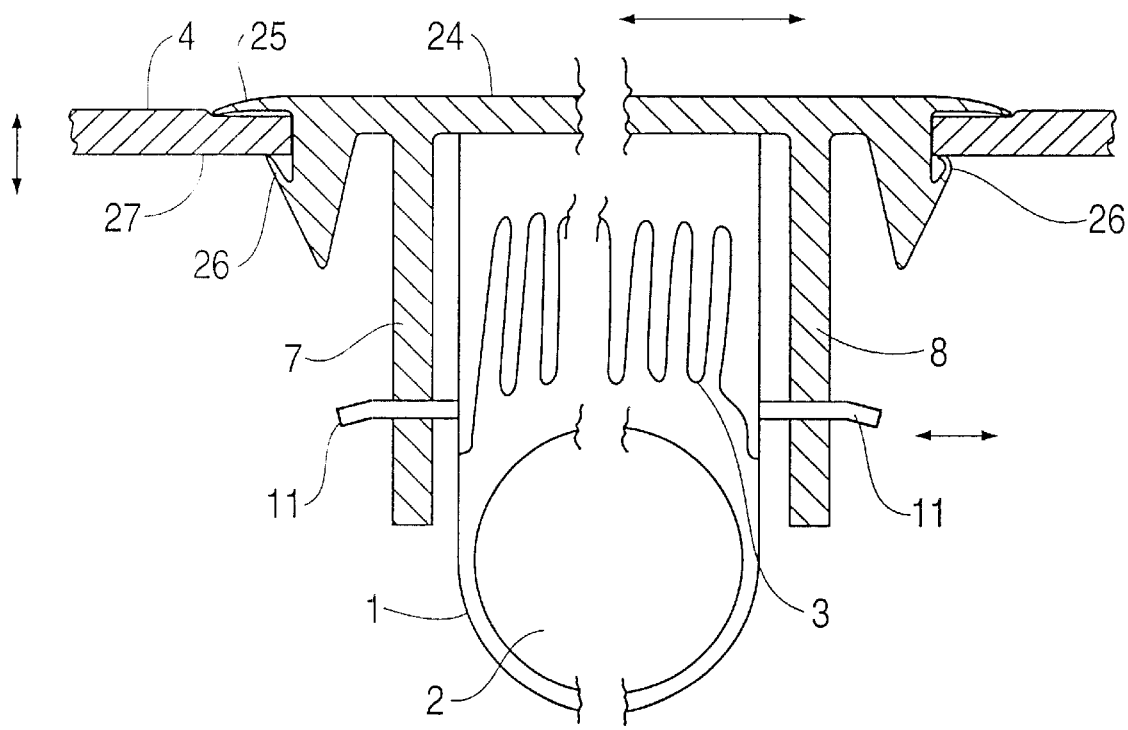
FIG. 8 is a cross section through a second embodiment of an airbag module with cover cap.
Figure 9:
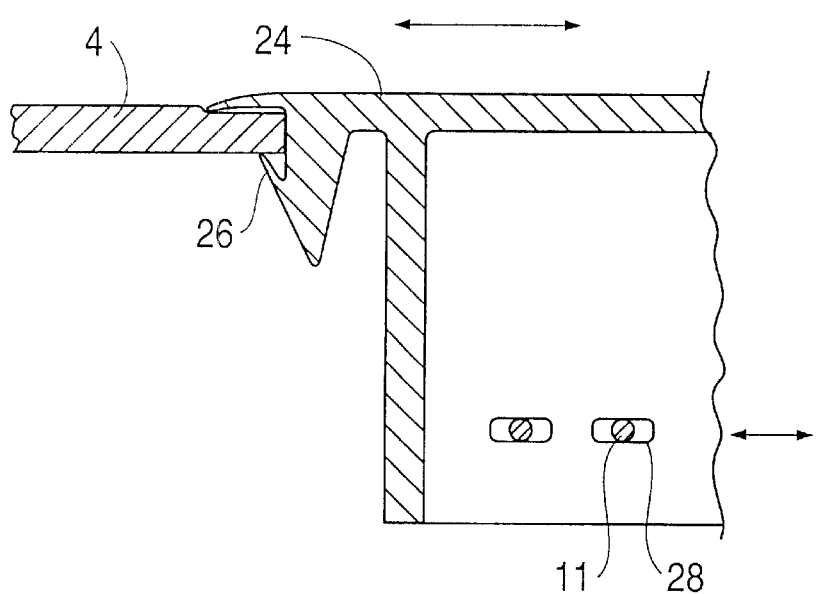
FIG. 9 is a longitudinal section through a portion of the airbag module according to FIG. 8.
Figure 10:
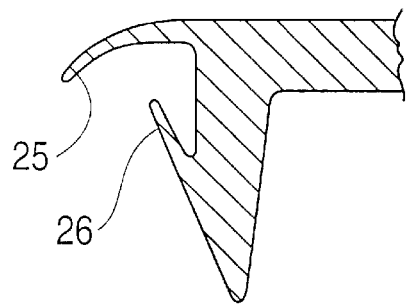
FIG. 10 is a section through the edge of the cover cap of the second embodiment.
Figure 11:
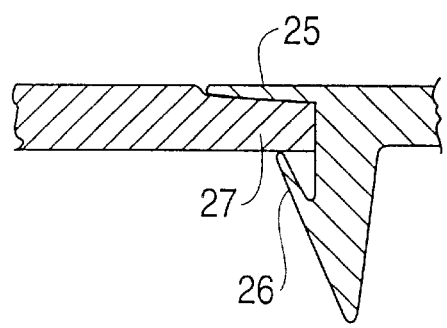
FIG. 11 is a cover cap edge in engagement with the edge of the instrument panel in a normal position.
Figure 12:
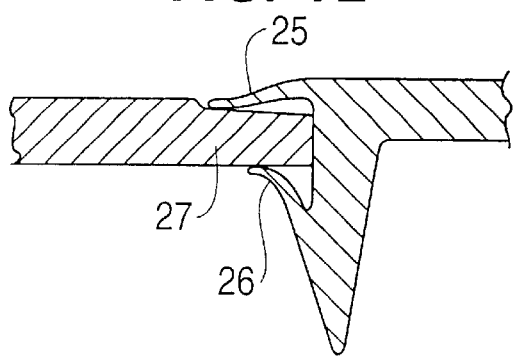
FIG. 12 is the cover cap edge in engagement with the edge of the instrument panel in the raised position.

In another embodiment shown in FIGS. 8 and 9, the cover cap 24 has, at the edge, peripheral flexible tongues 25, opposite which flexible hooks 26 are located. By virtue of the pointed narrow design of the hooks, increased flexibility is achieved, as compared with the hooks of the first embodiment. In this embodiment, the tongues and hooks allow the vertical movement of the cover cap relative to the instrument panel 4. As is apparent from FIG. 10, the tongues 25 are preformed downward. As a result, minimal height differences between the cover cap and the instrument panel are achieved peripherally, as can be seen from FIG. 11. The hooks 26 are expediently likewise preformed, as can be seen on the right side of FIG. 8, in order to support the underside of the instrument panel constantly from below and to ensure freedom from rattling between the cover cap and the instrument panel. In the event of an upward vertical relative movement, the tongues 25 and hooks 26 are deformed, as can be seen from FIG. 12. The edge 27 of the orifice of the instrument panel is designed, on the top side, with a depression such that the top edge of the instrument panel and the tongue top edge are flush with one another, both the tongues 25 and the edge 27 being wedge-shaped.

The movement of the cover cap 24 relative to the housing 1 in the lateral direction and in the direction of travel is made possible by horizontal long holes 28 which are located in the side walls 7, 8 and into which the bolts 11 engage as shown in FIG. 9.

What is claimed is:

1. An airbag module for a motor vehicle having an instrument panel, a vertical direction, a lateral direction, and a travel direction comprising:
    a module housing;
    a cover cap having at least one side wall, the cover cap being adapted to rest on the instrument panel and provided with flexible tongues that are adapted to rest on the instrument panel;
    a first latch adapted to allow movement of the cover cap relative to the instrument panel; and
    a second latch adapted to allow a distance between the side wall and the module housing to vary.

2. The airbag module according to claim 1, wherein a number of degrees of freedom of the first latch and the second latch is at most two.

3. An airbag module for a motor vehicle having an instrument panel, a vertical direction, a lateral direction, and a travel direction comprising:
    a module housing;
    a cover cap having at least one side wall, the cover cap being adapted to rest on the instrument panel and provided with flexible tongues that are adapted to rest on the instrument panel;
    a first latch adapted to allow movement of the cover cap relative to the instrument panel; and
    a second latch adapted to allow a distance between the side wall and the module housing to vary,
wherein the first latch is designed so that the cover cap is moveable laterally and in the direction of travel before the module housing of the airbag module is fastened to the motor vehicle, and wherein the second latch and the module housing are designed so that movement of the side wall of the cover cap relative to the module housing is possible only in the vertical direction and the direction of travel.

4. An airbag module for a motor vehicle having an instrument panel, a vertical direction, a lateral direction, and a travel direction comprising:
    a module housing;
    a cover cap having at least one side wall, the cover cap being adapted to rest on the instrument panel;
    a first latch adapted to allow movement of the cover cap relative to the instrument panel; and
    a second latch adapted to allow movement of the cover cap relative to the module housing,
wherein the first latch is flexible, and the cover cap further comprises flexible tongues that are adapted to rest on the instrument panel, wherein the second latch enables the cover cap to move vertically relative to the instrument panel, and wherein the first latch and the module housing are designed so that movement between the side wall of the cover cap and the module housing is possible in the lateral direction and in the direction of travel.

5. The airbag module for a motor vehicle having an instrument panel, a vertical direction, a lateral direction, and a travel direction comprising:
    a module housing;
    a cover cap having at least one side wall, the cover cap being adapted to rest on the instrument panel;
    a first latch adapted to allow movement of the cover cap relative to the instrument panel; and
    a second latch adapted to allow distance between the side wall and the module housing to vary; and
    wherein the first latch comprises a plurality of elastically deformable catch hooks which are adapted to engage an underside of instrument panel, and wherein the second latch comprises bolts on the housing module which engage holes in the side wall of the cover cap.

6. The airbag module according to claim 5, wherein the catch hooks are arranged peripherally on the cover cap, and wherein space between the catch hooks and the cover cap is such that the cover cap is adapted to be maintained, free of play, on the instrument panel.

7. The airbag module according to claim 5, wherein when the cover cap is arranged on the instrument panel, the catch hooks on the sides of the cover cap which run transversely to the direction of travel are more rigid than the catch hooks on the sides of the cover cap which run in the direction of travel.

8. The airbag module according to claim 5, wherein the catch hooks have roughened contact faces.

9. The airbag module according to claim 5, wherein the catch hooks have contact faces, and wherein the contact faces have bosses or ribs thereon.

10. The airbag module for a motor vehicle having an instrument panel, a vertical direction, a lateral direction, and a travel direction comprising:
    a module housing;
    a cover cap having at least one side wall, the cover cap being adapted to rest on the instrument panel;
    a first latch adapted to allow movement of the cover cap relative to the instrument panel; and
    a second latch adapted to allow a distance between the side wall and the module housing to vary; and
    wherein a perimeter of the cap has a nonrectangular shape, and wherein the cap is adapted to cover an orifice in the instrument panel which has a plurality of pairs of opposite edges which are parallel to one another, wherein a distance between a pair of edges varies among the pairs of edges.

11. An air bag module configured to be positioned in an instrument panel of a motor vehicle comprising:
    a cover cap having flexible tongues that are adapted to rest on the instrument panel and a first latch for connecting the cover to the instrument panel; and
    a second latch for connecting a side wall of the cover cap to a housing,
    wherein the first latch is configured to permit relative movement between the instrument panel and the cover cap in two degrees of freedom, wherein the second latch is configured to allow relative movement between the cover cap and the housing in a vertical direction, and wherein the second latch is adapted to allow a distance between a side wall of the cover cap and the housing to vary.

* * * * *